Nov. 10, 1936.                R. M. HICKS                2,060,674
                           REGISTERING SYSTEM
                         Filed March 28, 1931          3 Sheets-Sheet 1
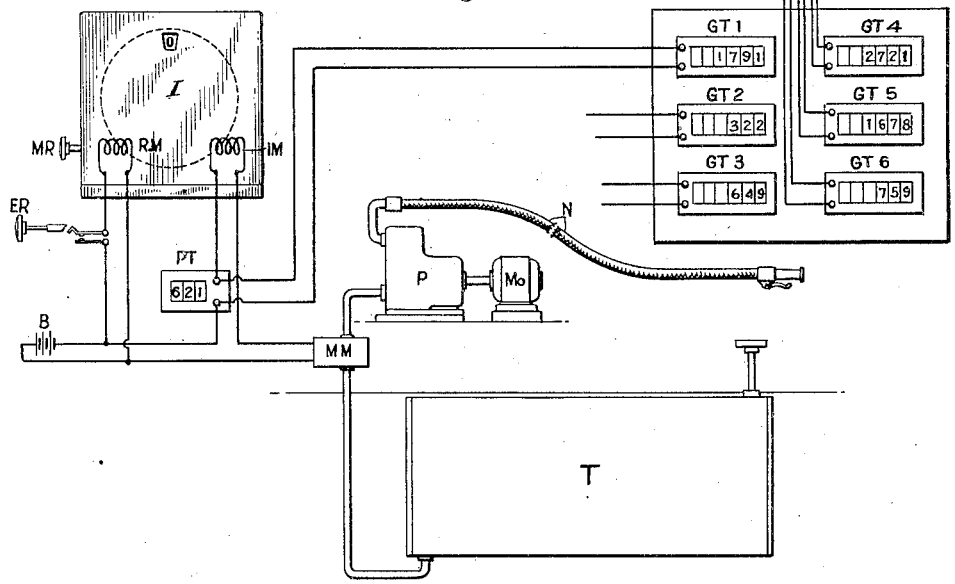
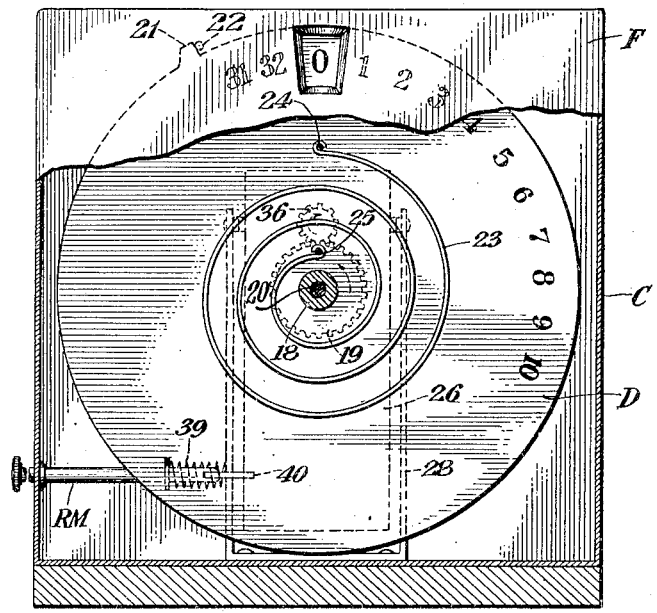
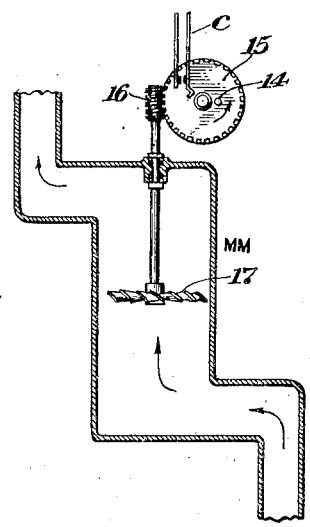
INVENTOR
*RAYMOND M. HICKS.*
BY
Ward, Crosby & Neal
ATTORNEYS

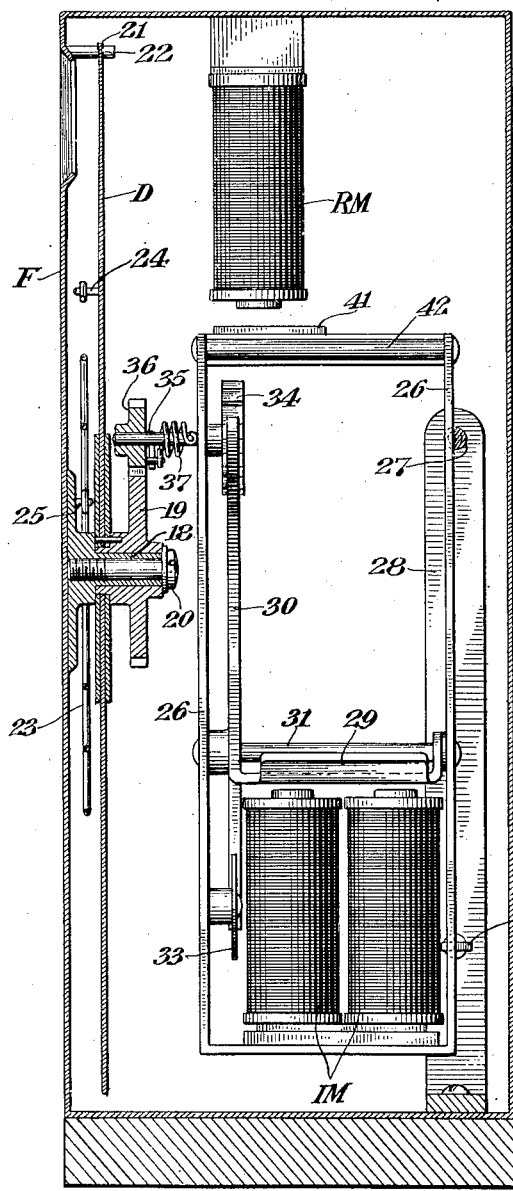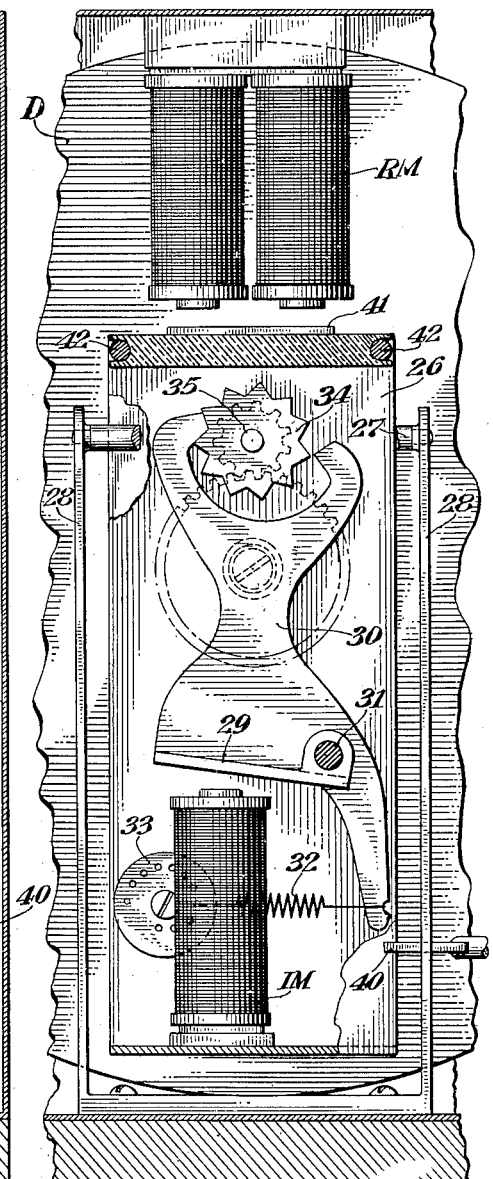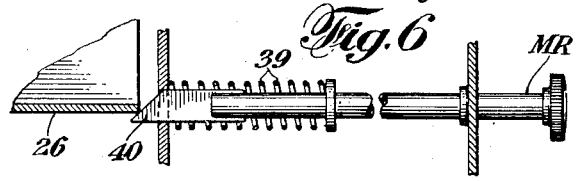

Nov. 10, 1936.  R. M. HICKS  2,060,674
REGISTERING SYSTEM
Filed March 28, 1931  3 Sheets-Sheet 3
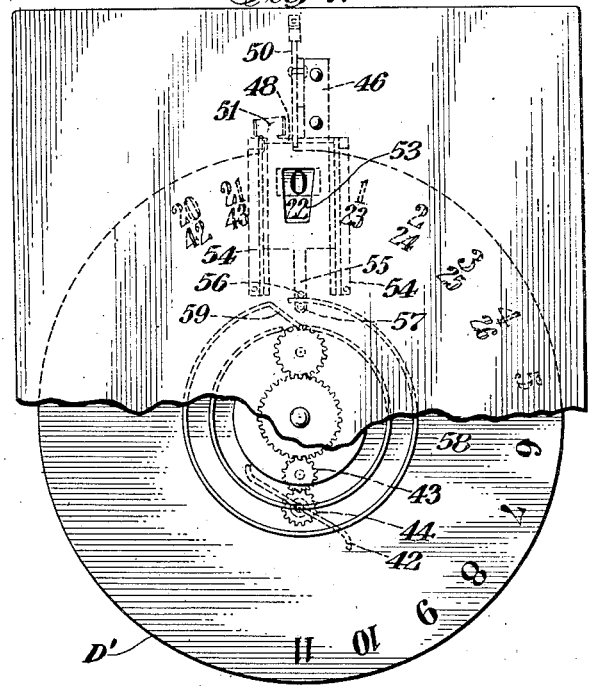
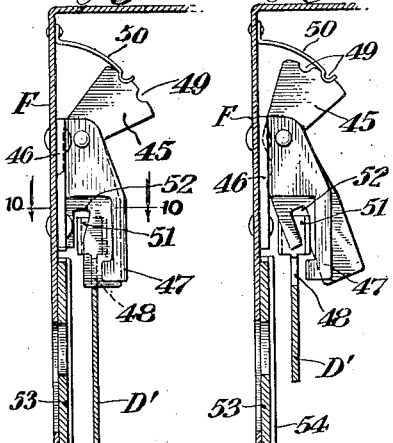
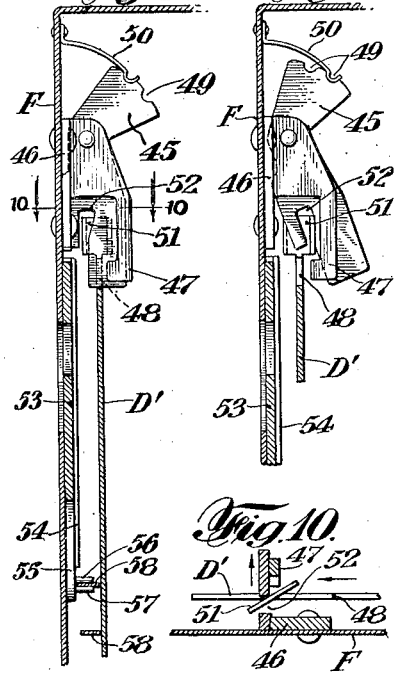
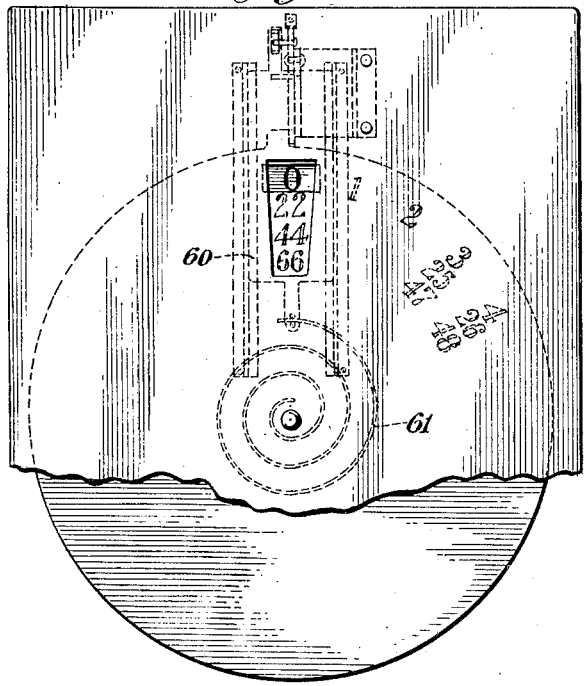
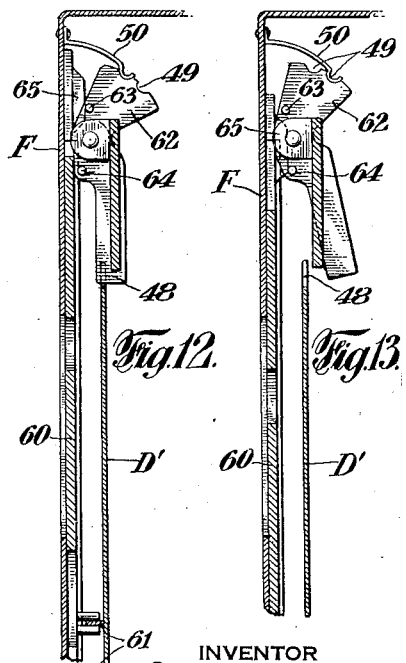
INVENTOR
RAYMOND M. HICKS.
BY
Ward, Crosby & Neal
ATTORNEYS Patented Nov. 10, 1936

2,060,674

UNITED STATES PATENT OFFICE 2,060,674

REGISTERING SYSTEM

Raymond M. Hicks, Plainfield, N. J., assignor to
The Teleregister Corporation, New York, N. Y.,
a corporation of Delaware Application March 28, 1931, Serial No. 525,911

6 Claims. (Cl. 235—144)

This invention relates to improvements in registering systems and registering devices.

Among the objects of this invention is the provision of a registering system for indicating the amount of commodity of each sale, the amount of commodity sold during a given short period, and the amount of commodity sold during an extended period, the system, as illustrated for purposes of disclosure, being adapted to register the amount of gasoline sold at a gasoline filling station and including for this purpose a single sale register associated with each pump, a daily or other desired short period register associated with each pump, and total registers for registering the amount of gasoline dispensed by each pump over any desired longer period of time, said total registers being preferably located on the same board in the station building or at any distant remote point desired.

Another object of this invention is the provision of an improved indicating or registering mechanism for indicating the amount of the individual sales made at the various pumps.

Other objects of this invention will be apparent from the description taken in connection with the drawings, in which Fig. 1 shows a schematic arrangement of the registering system;

Fig. 2 is a front view of an improved indicator or register for indicating or registering individual sales;

Fig. 3 is a section through the metering mechanism;

Fig. 4 is a vertical section taken substantially centrally of the indicator shown in Fig. 2;

Fig. 5 is a vertical section taken on the line 5—5 of Fig. 4;

Fig. 6 shows the manual resetting key;

Fig. 7 shows a modified form of indicator with certain parts omitted to more clearly show the construction of other parts thereof;

Fig. 8 is a vertical section through the indicator in Fig. 7 showing the zero stop in functioning position;

Fig. 9 is a section similar to Fig. 8 showing the zero stop moved out of functioning position;

Fig. 10 is a section on the line 10—10 of Fig. 8;

Fig. 11 shows another modification of the indicator with certain parts omitted to more clearly show other parts thereof;

Fig. 12 is a vertical section of Fig. 11 showing a modified form of zero stop in functioning position; and Fig. 13 is a section similar to that of Fig. 12 with the modified form of the zero stop in nonfunctioning position.

As shown in Fig. 1 a suitable pump P, which may be operated by a motor Mo, draws the gasoline from the storage tank T through a metering mechanism MM and dispenses it through the usual hose N. It is understood, of course, that the pump, motor and metering mechanism may be of any suitable construction.

Associated with each pump is an indicator which in Fig. 1 is designated I and which is electromagnetically operated by a magnet IM, the circuit over which is made from opposite poles of the battery B by means of a contact member c, Fig. 3, which is closed upon each rotation of a pin 14 on a worm gear 15 driven from a worm 16 on a shaft to which a turbine 17 operated by the flow of the gasoline from the tank to the pump, is secured. The construction is preferably such that the pin 14 will make one rotation for each gallon of gasoline delivered. This causes the circuit of the operating magnet IM to be closed upon delivery of each gallon of gasoline.

As shown in Fig. 1, a total register or consecutive counter PT, which may be a counter of the ordinary Veeder type, for example, as shown in the patent to Pidgin, No. 755,695; issued March 29, 1904 is also connected in this circuit. This counter or register may be used to total the sales for the day or any desired short period of time. This counter is preferably associated with the pump. The counter is provided with the usual turn-to-zero mechanism not shown.

Also, in each of the circuits of each of the indicators I is a grand total register or counter GT, see GT(1), on which is registered the total of sales for a longer period of time. These total registers or counters may also be of the Veeder type above referred to, and are preferably mounted on the same board which may be located in the building at the filling station, or at any desired remote point. It is obvious, of course, that pumps at various different filling stations may be equipped with registers I and PT, and that the total registers GT for the various pumps may be located at some central office if desired. The registers PT may also be located at the central office and may be used to indicate the daily sales of the different pumps at various stations, or to indicate the amount of gasoline dispensed from any pump after a refill of the tank, thereby supplying information as to the amount of gasoline in the various tanks. The registers GT may be turned to zero by the usual resetting mechanisms not shown.

The indicator I may be reset or turned to zero electrically by means of the magnet RM, Fig. 1, the circuit of which may be closed by a key ER. Provision is also made for resetting the indicator I mechanically by manipulation of a key MR.

The various forms of indicators shown may be mounted in any suitable cabinet which may, if desired, enclose the pump, motor and indicator PT.

In the construction of the indicator I the operating unit may include elements, such as the driving pawl 30 and ratchet wheel 34 disclosed in the patent to Merton L. Haselton, No. 2,049,499, issued August 4, 1936, in which the indicator is provided with eleven positions which accounts for the fact that in the indicator shown in Fig. 2 the dial D is divided into thirty-three sections bearing numerals indicating the number of gallons dispensed.

The indicators may be supported in a casing C which may be of any suitable design, the front face member F of which is provided with a window through which the indicating numerals may be viewed.

Supported on the rear side of the face member F is a stud 18, Fig. 4, which constitutes a bearing for a gear 19 pinned to the dial D. The gear and dial are held in position on the stud 18 by a bolt 20.

As shown in Figs. 2 and 4 the dial D is provided with a zero stop projection 21 which engages a pin 22 projecting from the rear side of the face member F of the casing C. The dial is normally held in zero position by a spiral spring 23 anchored to pin 24 on the dial D and to a pin 25 on the hub of the stud 18. As the dial D is moved counter-clockwise, Fig. 2, the tension of the spring 23 is increased and the energy stored in this spring will return the dial to the position shown in Fig. 2 upon operation of the resetting or clearing mechanism, later described.

As shown in Figs. 2, 4 and 5, the operating unit for the dial includes a frame 26 which is generally of U-shaped form and is pivotally supported by means of a shaft 27 on the ends of the legs of the U-shaped member 28 secured to the base of the casing. As shown in Fig. 4, this unit includes a pair of magnets IM which are operated by the circuit connections shown in Fig. 1. These magnets cooperate with an armature 29 on an operating fork 30 pivoted on a rod 31 supported in the side members of the frame 26. The fork 30 is preferably held in the position shown in Fig. 5 by means of a spring 32 adjustably mounted on the frame of the unit by means of a disk 33 provided with a series of spirally arranged anchoring holes. The fork 30 cooperates with a ratchet disk 34 which is provided with eleven teeth in view of the fact that eleven teeth are used in the standard construction shown in the application above referred to. It is obvious, of course, that the number of teeth on the ratchet may well be changed to suit conditions.

The ratchet disk 34 is supported on a shaft 35 mounted in one of the side members of the frame 26. Supported on the shaft is a gear 36 which is provided with eleven teeth cooperating with the gear 19 which in the form disclosed is provided with thirty-three teeth. The gear 36 is preferably connected to the shaft 35 by means of a spring 37. This connection is desirable to permit the gear 19 and the dial D to lag behind the movement of the shaft 35 in order to cut down the inertia, especially in cases where the fluid is dispensed at a rapid rate which causes rapid operation of the operating mechanism.

The operating unit is mounted pivotally on the bracket 28 in order that it may be swung to disconnect the gear 36 from the gear 19 for purposes of resetting the dial D. Rocking movement may be imparted to the frame to disengage the gear 36 from the gear 19 by means of the plunger key MR which is normally pressed outwardly by a spring 39 which permits the plunger to be moved inwardly and through its cam shaped end 40 to move the operating unit about its pivot 27 to disengage the gear 36 from the gear 19.

If desired, this rocking movement of the operating unit may be effected by means of a pair of reset magnets RM, the circuit of which may be made by the key ER, as shown in Fig. 1. For this purpose the upper end of the operating frame 26 carries an armature 41 which is connected to the frame 26 by a pair of spacer bolts or rivets 42, as clearly shown in Figs. 4 and 5.

In the form shown in Figs. 2, 4, 5 and 6, the dial is adapted to make one rotation and to indicate as high as thirty-two gallons for a single sale. After the indication has been observed, or at any time prior to serving another customer, the indicator dial is restored to zero by the spring 23 upon disengagement of the gear 36 from the gear 19, as the operating frame 26 is rocked by either the manual reset key MR or by the reset magnet RM which is energized by operation of the key ER.

For the purpose of increasing the registering capacity of the dial, the dial D', Figs. 7, 8 and 9, may be provided with concentrically arranged figures as indicated in Fig. 7 so that the first rotation of the dial may indicate from 1 to 22 gallons, and the second rotation of the dial may indicate that 23, 24, etc. gallons have been dispensed. The dial is preferably returned by a spring such as shown in Fig. 2, which however has not been disclosed in Figs. 7, 8 and 9 as its construction and operation are clearly understood. When the dial makes two rotations, for instance as when it registers a sale of more than twenty-two gallons, the tension on the spring will be much greater than in the first modification so that the speed of the dial, as it reaches its home position, may be considerably higher than in the first modification. For this reason it is deemed advisable to provide a governor arrangement in the form of a fan 42a which is driven from the gear 19 by means of intermediate gears 43 and 44 suitably supported in any manner on the casing C.

In this modification the zero stop indicated at 45 comprises a bell crank lever supported on a bracket 46 mounted on the inner side of the face member F of the cabinet. The bracket is provided with an extension 47 to brace the zero stop 45 as a zero stop shoulder 48 on the disk engages it when the indicator moves into its zero position. The zero stop 45 is provided with notches 49 engageable by a spring 50 whereby it may be held in the functioning position shown in Fig. 8 or in the non-functioning position shown in Fig. 9. The zero stop 45 is pivoted in order that the stop 48 on the dial D' may clear it as it is moved past it at the end of the first rotation of the dial.

The position of the zero stop is controlled by means of a cam element 51 formed on or secured to the dial D' which cooperates with a slot 52 in the zero stop member 45 to move it from the position shown in Fig. 8 to the position shown in Fig. 9 at the end of the first rotation of the dial. The dial is operated by a mechanism similar to that shown in the first modification and is released for resetting purposes in the same manner. At the beginning of the second rotation of the dial during its restoring movement the cam 51 moves the zero stop 45 from the position shown in Fig. 9 to the position shown in Fig. 8 so as to bring it into the path of the stop 48 on the dial D'.

As the indicia are arranged in concentric series, and as it is desirable to show a numeral in one series and mask the corresponding numeral of the other series, a slidable mask 53 is provided. This mask is slidably supported in guides 54 mounted on the inner side of the face member of the casing. The window in the face member F of the casing is of sufficient height to permit the display of a numeral in either series. The window in the mask 53 is of sufficient height to display either the outer or inner numeral.

The mask 53 is provided with a downwardly extending member 55 which is provided with pins 56 and 57 engaging opposite sides of a band 58 secured on edge to the dial D'. The band 58 comprises concentric circular portions connected by a portion 59 which operates as the dial completes its first rotation to move the mask from the position shown in Fig. 7 into position to display the numerals in the second or inner series of numerals. During the first rotation of the dial the numerals 0 to 21 and 22 may be displayed while during the second rotation of the dial the numerals 23 to 43 may be displayed.

As shown in Figs. 11, 12 and 13, the numerals on the dial may be arranged spirally and the opening in the face plate of the casing may be lengthened to show any one of the numerals. The cooperating mask 60, in this instance, is operated from a spiral band 61 so as to give the mask a continuous movement toward the center of the indicator as amounts are registered on the dial.

In view of the fact that the dial in this instance may make three rotations a modified form of zero stop mechanism is provided. The zero stop 62 is pivotally supported on the face plate F, as before, and is provided with pins 63 and 64 cooperating with a cam member 65 secured to and movable with the mask 60.

When the mask is in the zero position, shown in Fig. 11, the zero stop 62 is in the position indicated in Fig. 12 and is held in this position by engagement of the cam 65 with the pin 63. As the indicator dial is rotated and the mask 60 is moved downwardly the cam 65 is moved downwardly and as the dial completes one rotation the cam 65 at the upper cam surface thereof disengages from the pin 63 and at its lower cam surface engages a pin 64 and moves the zero stop 62 into the position shown in Fig. 13. The construction of the cam is such that the zero stop 62 will be maintained in this position during the second and third rotations of the indicator dial. It is obvious, of course, that the zero stop will be maintained in this position as the dial returns until it begins its last rotation toward the zero position when the cam 65 will function to move the zero stop from the position shown in Fig. 13 to the position shown in Fig. 12.

While one embodiment of the general system has been shown and described, and while three forms of the sales indicator have been shown and described, it is to be understood that changes in this system and in the construction of the sales indicators may be made without departing from the principle of the invention disclosed.

What I claim is:

1. In combination with a rotatable indicator element means for moving said indicator element forwardly through at least two rotations, means for returning said indicator element to its home position, means for arresting said indicator element in its home position, means operable as the indicator element completes its first forward rotation for rendering said arresting means ineffective, means for holding said arresting means ineffective during the second forward rotation of said indicator element and during the first return rotation of said indicator element, and means for rendering said arresting means effective during the last return rotation toward home position.

2. In combination with a rotatable indicator element adapted to be moved forwardly through more than one rotation, means for stopping said indicator element in its home position, means normally tending to move said indicator element into its home position, and means operable as the indicator element completes its first forward rotation for rendering said stopping means ineffective so that said indicator element may be moved through a second forward rotation, and means operable at the beginning of the last rotation toward home position for causing said stopping means to function to arrest the indicator element in its home position.

3. The combination with an indicator element provided with a spiral series of numerals, including at least three convolutions, of means for determining which numeral indicates the setting of the indicator element, a stop for arresting the indicator element in its home position, means normally tending to move the indicator element into its home position, and means operable at the end of the first forward rotation of the indicator element to render said stop ineffective and operable during the last rotation toward home position to cause said stop to arrest said indicator element in its home position.

4. The combination with an indicator element provided with a continuous series of numerals, including at least three sub-series located at different distances from the axis of said indicator element, of a stop for arresting the indicator element in its home position, means normally tending to move said indicator element into its home position, and means for rendering said stop ineffective at the end of the first forward rotation and for holding it ineffective during further forward rotation of said indicator element and functioning at the beginning of the last rotation toward home position for causing said stop to function to stop said indicator element in its home position.

5. The combination with an indicator element provided with a continuous series of numerals, including at least two sub-divisions spaced at different radial distances from the axis of the indicator element, of a mask provided with an opening for displaying one indicium at a time, means for moving said mask as the indicator element is rotated, a stop for arresting the indicator element in its home position, means tending to move said indicator element into its home position, and means operated by said mask for rendering said stop ineffective at the end of the first rotation in the forward direction and for rendering said stop effective at the beginning of the last rotation of the indicator element toward home position.

6. The combination with an indicator element provided with indicia respectively located at different distances from the axis of said indicator element, of a mask provided with an opening for displaying the indicia, means for moving said mask as the indicator element is moved to selectively display the indicia corresponding to the settings of the indicator element, means for moving said indicator element into its home position, a stop device for arresting the indicator element in its home position, and means operative in accordance with the movement of the indicator element for rendering said stop device ineffective during movement of the indicator element away from home position and for rendering said stop device effective during the return movement of the indicator element towards home position.

RAYMOND M. HICKS.